(12) United States Patent
Limberger et al.

(10) Patent No.: US 11,333,768 B2
(45) Date of Patent: May 17, 2022

(54) METHOD AND APPARATUS FOR CHECKING IONOSPHERIC CORRECTION PARAMETERS FOR SATELLITE NAVIGATION FOR A VEHICLE

(71) Applicant: Robert Bosch GmbH, Stuttgart (DE)

(72) Inventors: Marco Limberger, Ludwigsburg (DE); Markus Langer, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 289 days.

(21) Appl. No.: 16/400,136

(22) Filed: May 1, 2019

(65) Prior Publication Data
US 2019/0339394 A1 Nov. 7, 2019

(30) Foreign Application Priority Data
May 3, 2018 (DE) ...................... 10 2018 206 788.0

(51) Int. Cl.
*G01S 19/07* (2010.01)
*G01S 19/42* (2010.01)
*G01S 19/06* (2010.01)

(52) U.S. Cl.
CPC ............ *G01S 19/072* (2019.08); *G01S 19/07* (2013.01); *G01S 19/42* (2013.01); *G01S 19/06* (2013.01)

(58) Field of Classification Search
CPC .......... G01S 19/07; G01S 19/06; G01S 19/42; G01S 19/072
USPC ........................ 342/357.44, 357.25, 357.43
See application file for complete search history.

(56) References Cited

U.S. PATENT DOCUMENTS

| | | | | |
|---|---|---|---|---|
| 6,163,295 A | * | 12/2000 | Nagasamy | G01S 19/40 342/357.59 |
| 6,169,958 B1 | * | 1/2001 | Nagasamy | G01S 19/40 342/357.59 |
| 6,356,232 B1 | * | 3/2002 | Rocken | G01S 19/04 342/357.23 |
| 7,256,730 B2 | * | 8/2007 | Hernandez-Pajares | G01S 19/44 342/357.27 |
| 7,741,994 B2 | * | 6/2010 | Pande | G01S 19/072 342/357.44 |
| 7,840,351 B2 | * | 11/2010 | Hwang | G01S 19/07 701/478.5 |
| 7,994,973 B2 | * | 8/2011 | Kobori | G01S 19/23 342/357.44 |

(Continued)

*Primary Examiner* — Chuong P Nguyen
(74) *Attorney, Agent, or Firm* — Maginot, Moore & Beck LLP

(57) ABSTRACT

The disclosure relates to a method for checking ionospheric correction parameters for satellite navigation for a vehicle. The method has a step of reading a provider signal from an interface with a correction data provider. The provider signal represents ionospheric correction parameters for correcting ionospheric influences for a geographic position in satellite navigation. The method also has a step of determining correction data using information relating to the state of the ionosphere between a satellite receiver of the vehicle at the geographic position and at least one satellite. The state information is defined using at least one satellite signal transmitted between the at least one satellite and the satellite receiver. The method also has a step of performing a comparison between the ionospheric correction parameters and the correction data in order to check the ionospheric correction parameters.

10 Claims, 3 Drawing Sheets

(56) References Cited

U.S. PATENT DOCUMENTS

| | | | | |
|---|---|---|---|---|
| 8,044,849 B2* | 10/2011 | Ferguson | ............... | H03M 7/30 |
| | | | | 342/357.44 |
| 9,488,735 B2* | 11/2016 | Tominaga | ............ | G01S 19/073 |
| 9,494,693 B2* | 11/2016 | Hernandez-Pajares | ...................... | |
| | | | | G01S 19/29 |
| 9,923,626 B2* | 3/2018 | Loomis | ............. | H04B 7/18513 |
| 10,078,140 B2* | 9/2018 | Drescher | .............. | G01S 19/072 |
| 10,267,919 B2* | 4/2019 | Nagao | .................. | G01S 19/072 |
| 10,365,375 B2* | 7/2019 | Um | ....................... | G01S 19/072 |
| 10,690,775 B2* | 6/2020 | Jokinen | ................ | G01S 19/072 |
| 10,962,651 B2* | 3/2021 | Liu | ......................... | G01S 19/40 |
| 2005/0146461 A1* | 7/2005 | Pande | .................. | G01S 19/072 |
| | | | | 342/357.44 |
| 2010/0225536 A1* | 9/2010 | Kobori | ................... | G01S 19/23 |
| | | | | 342/357.44 |
| 2013/0021201 A1* | 1/2013 | del Castillo | ........... | G01S 19/07 |
| | | | | 342/357.59 |
| 2014/0009331 A1* | 1/2014 | Tominaga | .............. | G01S 19/07 |
| | | | | 342/357.23 |
| 2019/0250278 A1* | 8/2019 | Huck | ...................... | G01S 19/14 |
| 2021/0149060 A1* | 5/2021 | Limberger | ............. | G01S 19/41 |

* cited by examiner

METHOD AND APPARATUS FOR CHECKING IONOSPHERIC CORRECTION PARAMETERS FOR SATELLITE NAVIGATION FOR A VEHICLE

This application claims priority under 35 U.S.C. § 119 to application no. DE 10 2018 206 788.0, filed on May 3, 2018 in Germany, the disclosure of which is incorporated herein by reference in its entirety.

TECHNICAL FIELD

The disclosure relates to an apparatus, a method, or a computer program for satellite navigation for a vehicle and, in particular, for checking ionospheric correction parameters.

BACKGROUND

To correct positioning signals in satellite navigation, deviations in the Earth's ionosphere can be taken into account, for example. Correction data services for GNSS (Global Navigation Satellite System) can provide a user or a GNSS receiver with correction values which are needed for highly accurate positioning and with which systematic errors within a GNSS system can be corrected. These include, for example, satellite clock corrections, satellite orbit data corrections and parameters for correcting ionospheric influences. Ionospheric interference can, however, also occur in particular locally and can sometimes remain hidden from a reference station network of the correction data provider, for example owing to an excessively large distance between individual reference stations, or can be difficult to model so that a user can use the correction data to compensate or correct local ionospheric interference.

SUMMARY

Against this background, a method, an apparatus which uses this method and also a corresponding computer program are presented with the approach presented here. The measures indicated in the detailed embodiments allow advantageous developments and improvements to the apparatus.

According to embodiments, ionospheric correction data received from a provider can in particular be compared with observed values, for example ionospheric errors calculated from GNSS receiver observations, for satellite navigation and localization using satellites. In other words, ionospheric correction parameters or ionospheric corrections determined therefrom from a correction data service can in particular be compared with ionospheric errors calculated by a user's GNSS receiver. Therefore, ionospheric correction data received externally from a service provider can be compared, for example in a satellite receiver or for a satellite receiver, with internal observation variables generated independently by the GNSS receiver.

According to embodiments, in particular integrity and security can advantageously be improved and highly accurate localization can be made possible for satellite navigation and localization by means of satellites. For example, inconsistencies which can be present between received and observed or calculated ionospheric correction data can be identified and taken into account during further processing in a navigation system, positioning system or the like. This can also increase in particular the integrity of an overall system in which a GNSS receiver is used. An advantageous check of the consistency between observation and model thus allows deviations to be detected reliably and thus interference in the Earth's ionosphere to be identified in an accurate and position-related manner.

The quality and accuracy of a calculation of ionospheric correction parameters over an area can also depend, for example, on a selected interpolation approach between given data points, wherein, depending on the choice of interpolation model, possible residual errors can remain in the ionospheric correction parameters. According to embodiments, a GNSS user can in particular rely on more than one correction data provider selected model approach, since it can be made possible for the model quality of a correction service to be checked or evaluated with the aid of actual GNSS measurements by a user's apparatus. Local ionospheric interference not detected by a correction service provider can thus also be taken into account during navigation and localization.

A method for checking ionospheric correction parameters for satellite navigation for a vehicle is presented, the method having the following steps:

reading a provider signal from an interface with a correction data provider, the provider signal representing ionospheric correction parameters for correcting ionospheric influences for a geographic position in satellite navigation;

determining correction data using information relating to the state of the ionosphere between a satellite receiver of the vehicle at the geographic position and at least one satellite, the state information being defined using at least one satellite signal transmitted between the at least one satellite and the satellite receiver; and performing a comparison between the ionospheric correction parameters and the correction data to check the ionospheric correction parameters.

This method can be implemented, for example, in software or hardware or in a mixed form of software and hardware, for example in a controller or an apparatus. Satellite navigation can also include localization of a vehicle in which the satellite receiver is situated. The satellite receiver can be designed to allow position determination by satellite navigation using at least one satellite signal for a user and additionally or alternatively for a user's equipment. The satellite receiver can be in the form of a dual-frequency satellite receiver or a multi-frequency satellite receiver. The state information can represent a characteristic variable of the Earth's ionosphere, in particular in a local region of the ionosphere between the geographic position of the satellite receiver and a relevant satellite. The provider signal can be read by a radio interface or the like. The provider signal can then be transmitted from the correction data provider for example via L band, Internet, GSM (Global System for Mobile Communications) or the like.

According to one embodiment, in the performing step, a comparison result can be generated which represents a deviation between model-based ionospheric correction parameters and observation-based correction data and additionally or alternatively a fluctuation in the ionospheric correction parameters and, additionally or instead, in the correction data. Such an embodiment has the advantage that the check also allows inaccurate ionospheric correction parameters owing to unforeseeable local interference in the ionosphere to be adjusted. Deviations between observation and model can for example also be used for error detection. In addition, the deviation can be taken into account in a calculation of a navigation solution, for example with regard to a geographic position, speed, inclination or the like.

In the performing step, local ionospheric interference can also be identified depending on a deviation between model-based ionospheric correction parameters and observation-based correction data and additionally or alternatively depending on a fluctuation in the ionospheric correction parameters and, additionally or instead, in the correction data. Such an embodiment has the advantage that local ionospheric interference can be detected reliably and accurately on the basis of deviations between observation and model.

The method can also have a step of supplying a check signal depending on a comparison result for use by the satellite receiver, the correction data provider and, additionally or alternatively, a satellite navigation device in the vehicle. The check signal can include a comparison result generated in the performing step. The check signal can be suitable for effecting an adjustment of ionospheric correction parameters and, additionally or alternatively, satellite signals with regard to deviations, interference and, additionally or alternatively, a current state of the ionosphere. Such an embodiment has the advantage that, by taking into account the deviation underlying the check signal, error detection, ionospheric interference detection and an increase in integrity for local appliances and devices and for a higher-level system or overall system in which the satellite receiver is embedded can be achieved.

In particular, the reading step, the determining step and, additionally or alternatively, the performing step can be carried out by means of the satellite receiver. Optionally, the aforementioned supplying step can also be carried out by means of the satellite receiver.

Such an embodiment has the advantage that the ionospheric correction parameters obtained from a service provider can be checked at the actual location of use and thus in a targeted manner.

In addition, in the determining step, the state information can be defined using a signal change of the at least one satellite signal. In this case, the signal change can represent a result of a comparison of at least one signal property relating to at least two transmission frequencies of the at least one satellite signal. The at least one signal property can represent a pseudo distance, a carrier phase and, additionally or alternatively, at least one further signal property. Such an embodiment has the advantage that the state information can be determined reliably and accurately.

According to one embodiment, in the determining step, state information can be used which represents a total electron content as a characteristic variable of the Earth's ionosphere. In this case, the total electron content can be defined as a product of electron density and path, measured in electrons per square meter. Such an embodiment has the advantage that reliable statements about the state of the ionosphere in a local region between a respective satellite receiver and a respective satellite can be obtained on the basis of state information of this type.

The approach presented here also provides an apparatus which is designed to perform, activate or implement the steps of a variant of a method presented here in suitable devices. The problem addressed by the disclosure can also be solved quickly and efficiently by means of this variant of the disclosure in the form of an apparatus.

To this end, the apparatus can have at least one computing unit for processing signals or data, at least one memory unit for storing signals or data, at least one interface with a sensor or with an actuator for reading sensor signals from the sensor or for outputting data signals or control signals to the actuator, and/or at least one communication interface for reading or outputting data which are embedded in a communication protocol. The computing unit can for example be a signal processor, a microcontroller or the like, wherein the memory unit can be a flash memory, an EEPROM or a magnetic memory unit. The communication interface can be designed to read or output data in a wireless and/or wired manner, wherein a communication interface which can read or output wired data can read said data from a suitable data transmission line or output said data into a suitable data transmission line for example electrically or optically.

In the present case, an apparatus can be understood as an electrical appliance which processes sensor signals and outputs control signals and/or data signals depending thereon. The apparatus can have an interface which can be designed in the form of hardware and/or software. With a hardware design, the interfaces can for example be part of a system ASIC, which contains a wide variety of functions of the apparatus. However, it is also possible for the interfaces to be dedicated integrated circuits or to consist at least partially of discrete components. With a software design, the interfaces can be software modules which are present for example on a microcontroller in addition to other software modules.

In an advantageous embodiment, the apparatus can be designed as part of a satellite receiver or a device connected for signal transmission to a satellite receiver. In particular, the apparatus can be mounted on a vehicle, situated inside a vehicle, and, additionally or alternatively, designed as part of an appliance mounted on a vehicle. By means of the apparatus, a check is made with regard to a correction of a signal transmission between at least one satellite and a satellite receiver for satellite-assisted navigation. To this end, the apparatus can, for example, access provider signals and satellite signals. Activation takes place via signal transmission devices such as transmitters, transceivers and antennas.

Also advantageous is a computer program product or computer program having program code which can be stored on a machine-readable carrier or storage medium such as a solid state memory, a hard drive or optical storage and is used to perform, implement and/or activate the steps of the method according to one of the above-described embodiments, in particular when the program product or program is executed on a computer or an apparatus.

BRIEF DESCRIPTION OF THE DRAWINGS

Exemplary embodiments of the approach presented here are shown in the drawings and explained in more detail in the description below. In the drawings.

DETAILED DESCRIPTION

In the description of favorable exemplary embodiments of the present disclosure below, identical or similar reference signs are used for the similarly acting elements shown in the different figures; the description of these elements is not repeated.

Figure 1:
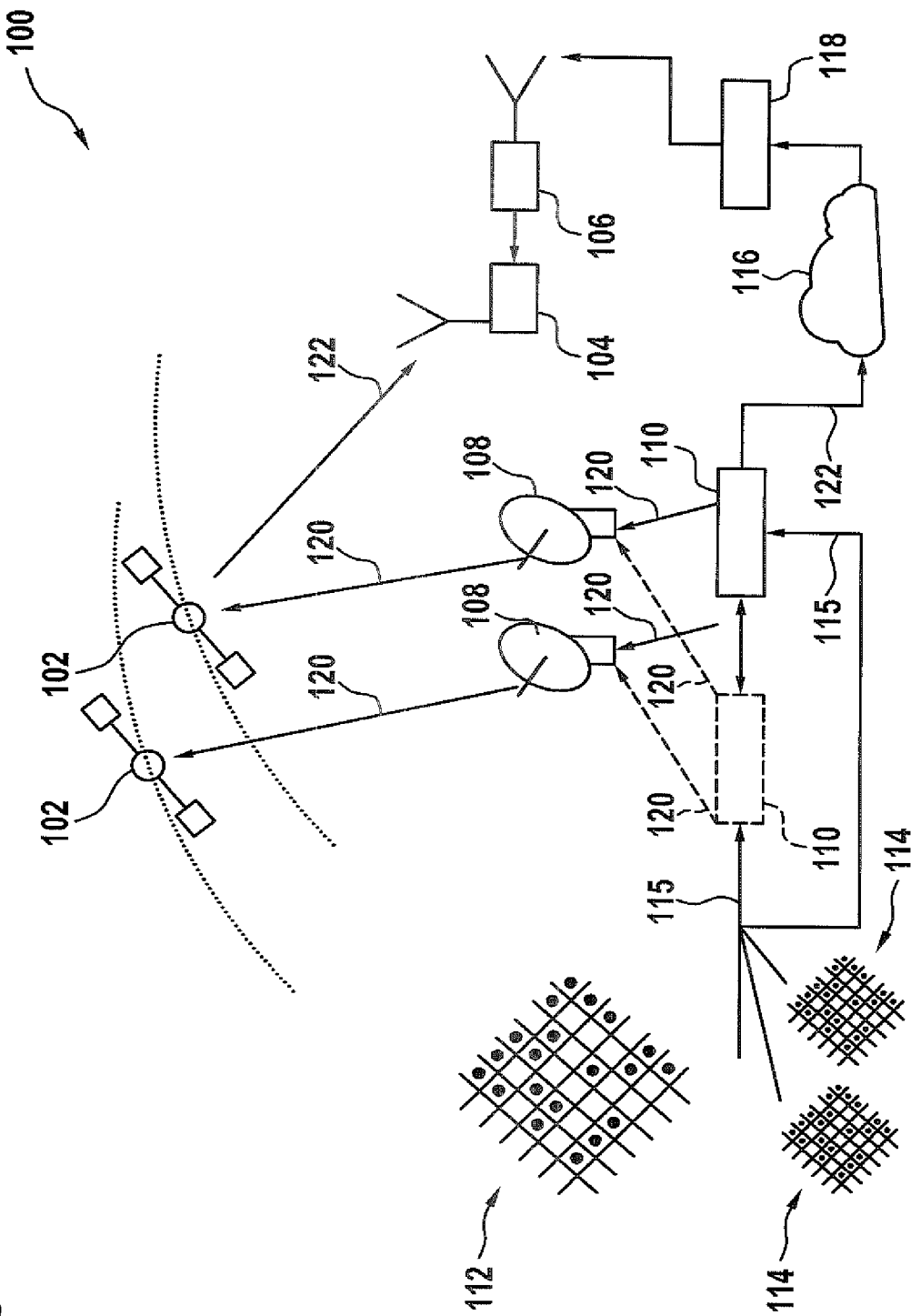
FIG. 1 shows a schematic diagram of a satellite navigation system.

FIG. 1 shows a schematic diagram of a satellite navigation system 100. The satellite navigation system 100 is for example in the form of a Global Navigation Satellite System (GNSS). The satellite navigation system 100 has a correction service.

The satellite navigation system 100 has satellites 102, which are situated in particular in a geostationary orbit around the Earth. In particular, the satellite navigation system 100 has a plurality of satellites 102 or redundant satellites 102. In this case, a first of the satellites 102 can be positioned over North America, for example, and a second of the satellites 102 can be positioned over Europe, for example.

The satellite navigation system 100 also has a plurality of satellite receivers 104; for reasons of space, only one satellite receiver 104 is shown by way of example in the diagram of FIG. 1. The satellite receiver 104 can also be referred to as a GNSS receiver 104. Communication modules 106 are connected for signal transmission to the satellite receiver 104.

The satellite navigation system 100 also has a plurality of transmission stations 108 for transmitting signals to the satellites 102. The transmission stations 108 can also be referred to as uplink stations 108 or stations 108 for an uplink. The transmission stations 108 are connected for signal transmission to at least one data center 110 or server 110. Only two data centers 110 are shown by way of example in FIG. 1. The data centers 110 are connected for signal transmission to one another, in particular to perform a consistency check.

In addition, the satellite navigation system 100 has a plurality of global reference stations 112 and optionally a plurality of additional local reference stations 114. The reference stations 112, 114 are designed to obtain correction values 115. The reference stations 112, 114 are connected for signal transmission to the at least one data center 110.

The at least one data center 110 is connected for signal transmission to the communication modules 106 and thus to the satellite receivers 104 via a backend server 116 and a mobile data connection 118 or mobile Internet connection 118.

Correction data 120 are transmitted from the at least one data center 110 via the transmission stations 108 to the satellites 102. Integrity information 122 is also transmitted from the at least one data center 110 via the backend server 116 and the mobile data connection 118 to the communication modules 106 and thus the satellite receivers 104 and from the satellites 102 to the satellite receivers 104.

Figure 2:
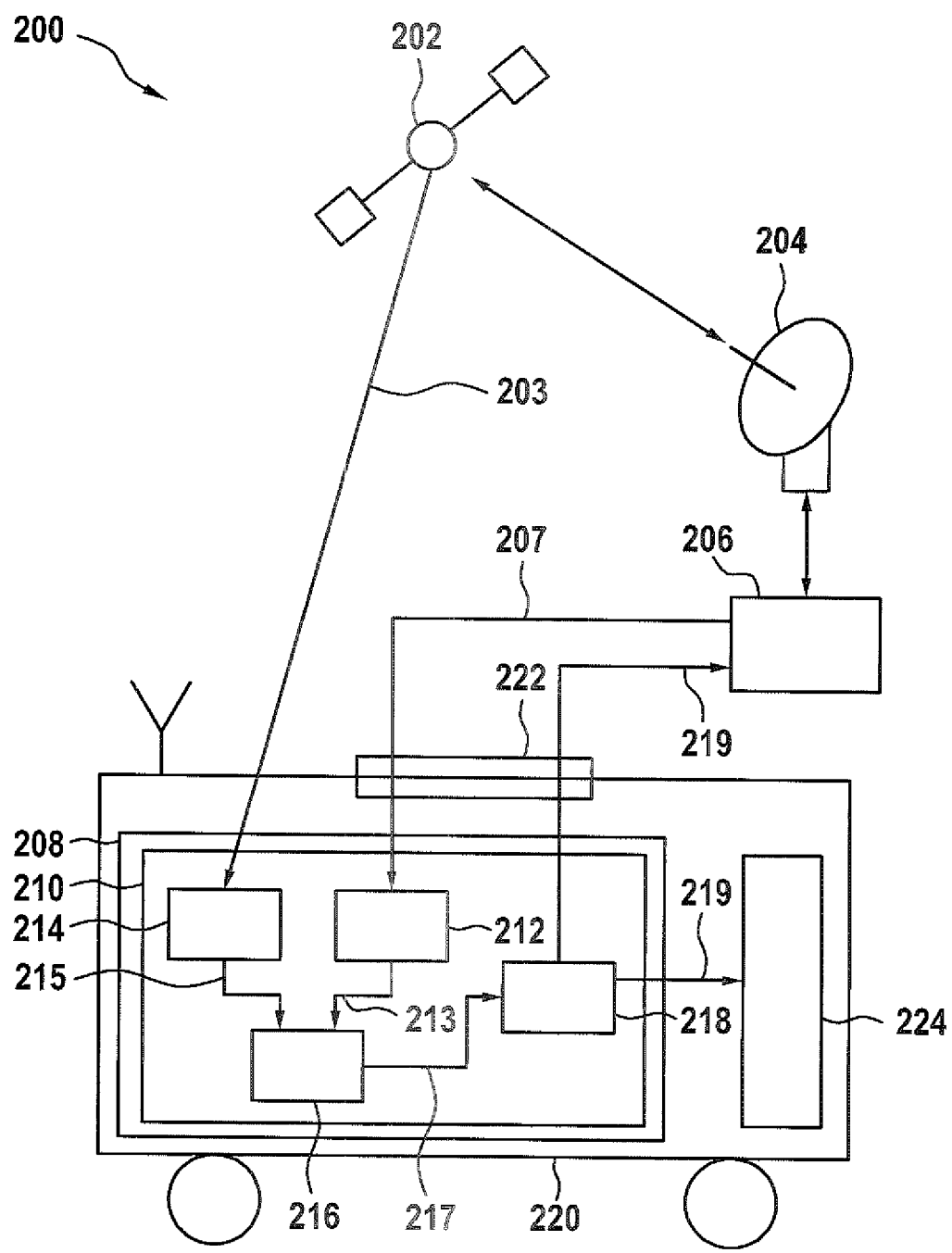
FIG. 2 shows a schematic diagram of a satellite navigation system having an apparatus for checking according to an exemplary embodiment.

FIG. 2 shows a schematic diagram of a satellite navigation system 200 having an apparatus 210 for checking according to an exemplary embodiment. The satellite navigation system 100 is for example in the form of a Global Navigation Satellite System (GNSS). The satellite navigation system 200 can correspond or be similar to the satellite navigation system of FIG. 1, with only some elements of the satellite navigation system of FIG. 1 being omitted and shown elements being referred to differently.

Of the satellite navigation system 200, the diagram of FIG. 2 shows in particular only one satellite 202 by way of example, only one ground station or transmission station 204 by way of example, one correction data provider 206, only one satellite receiver 208 by way of example, and the apparatus 210 for checking or a checking apparatus 210. The checking apparatus 210 is assigned to the satellite receiver 208. According to the exemplary embodiment shown here, the checking apparatus 210 is designed as a part of the satellite receiver 208.

The satellite 202 is situated for example in a geostationary orbit around the Earth. In particular, the satellite navigation system 100 can have a plurality of satellites 202 or redundant satellites 202. The transmission station 204 is connected for signal transmission to the satellite 202. For example, the satellite navigation system 100 can have a plurality of transmission stations 204.

The correction data provider 206 represents a plurality of devices of a satellite navigation service provider. According to the exemplary embodiment shown in FIG. 2, the correction data provider 206 is connected for signal transmission to the transmission station 204. The correction data provider 206 is designed to output a provider signal 207 which includes or represents ionospheric correction parameters 213 for correcting ionospheric influences for a geographic position in satellite navigation.

The satellite receiver 208 having the checking apparatus 210 is part of a vehicle 220 or is at least temporarily situated in the vehicle 220. Of the vehicle 220, an interface 222 and a satellite navigation device 224 are also shown. The satellite receiver 208 is connected for signal transmission to the satellite 202. The checking apparatus 210 is thus also connected for signal transmission to the satellite 202. The satellite receiver 208 and/or the checking apparatus 210 is/are also connected for signal transmission to the interface 222. In contrast to FIG. 2, the interface 222 can also be part of the satellite receiver 208 or the checking apparatus 210.

The checking apparatus 210 is designed to check ionospheric correction parameters 213 for satellite navigation for the vehicle 220. To this end, the checking apparatus 210 has a reading device 212, a determining device 214 and a performing device 216.

The reading device 212 is designed to read the provider signal 207 from the interface 222 with the correction data provider 206. In this case, the provider signal 207 is transmitted for example by radio from the correction data provider 206 to the vehicle 220, in particular to the interface 222. The reading device 212 is also designed to forward the ionospheric correction parameters 213 to the performing device 216.

The determining device 214 is designed to receive or read a satellite signal 203 from the satellite 202. The determining device 240 is also designed to determine correction data 215 using information relating to the state of the ionosphere between the satellite 202 and the satellite receiver 208 at the geographic position. In this case, the state information can be defined using at least one satellite signal 203 transmitted between the satellite 202 and the satellite receiver 208. The determining device 240 is also designed to forward the correction data 215 to the performing device 216. In particular, the state information is defined using a signal change of the at least one satellite signal 203. In this case, the signal change represents a result of a comparison of at least one signal property relating to at least two transmission frequencies of the at least one satellite signal 203. Error for example state information is used which represents a total electron content as a characteristic variable of the Earth's ionosphere, the total electron content being defined as a product of electron density and path, measured in electrons per square meter.

The performing device 216 is designed to perform a comparison between the ionospheric correction parameters 213 and the correction data 215 in order to check the ionospheric correction parameters 213. According to the exemplary embodiment shown in FIG. 2, the performing device 216 is designed to generate a comparison result 217. According to one exemplary embodiment, the comparison result 217 represents a deviation between model-based ionospheric correction parameters 213 and observation-based correction data 215. Additionally or alternatively, the comparison result 217 represents a fluctuation in the ionospheric correction parameters 213 and/or in the correction data 250. Optionally, the performing device 216 is also designed to identify local ionospheric interference depending on a deviation between model-based ionospheric correction parameters 213 and observation-based correction data 215 and/or depending on a fluctuation in the ionospheric correction parameters 213 and/or in the correction data 215.

According to the exemplary embodiment shown in FIG. 2, the checking apparatus 210 also has a supplying device 218. The supplying device 218 is designed to supply, depending on the comparison result 217, a check signal 219 for use by the satellite receiver 208, by the correction data provider 206, and/or by the satellite navigation device 224 of the vehicle 220. To this end, the checking apparatus 210, in particular the supplying device 218, is connected for signal transmission to at least one device of the satellite receiver 208, to the correction data provider 206 via the interface 222, and/or to the satellite navigation device 294.

Figure 3:
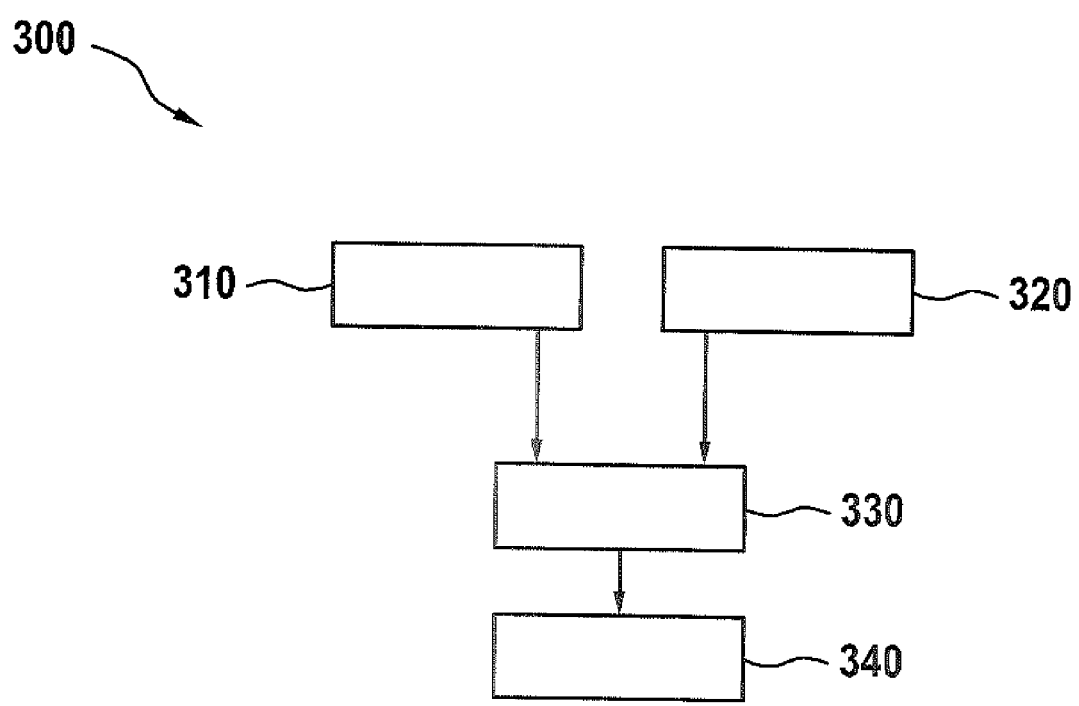
FIG. 3 shows a flow chart of a checking method according to an exemplary embodiment.

FIG. 3 shows a flow chart of a checking method 300 according to an exemplary embodiment. The method 300 can be carried out to check ionospheric correction parameters for satellite navigation for a vehicle. The checking method 300 can be carried out in connection with or using apparatus from FIG. 2 or a similar apparatus and/or the satellite receiver from FIG. 2, or a similar satellite receiver.

In a reading step 310 of the checking method 300, a provider signal is read from an interface with a correction data provider. The provider signal represents ionospheric correction parameters for correcting ionospheric influences for a geographic position in satellite navigation. In a determining step 320 of the checking method 300, correction data are determined using information relating to the state of the ionosphere between a satellite receiver of the vehicle at the geographic position and at least one satellite. The state information is defined using at least one satellite signal transmitted between the at least one satellite and the satellite receiver. Then, in a performing step 330 of the checking method 300, a comparison is performed between the ionospheric correction parameters and the correction data in order to check the ionospheric correction parameters.

According to one exemplary embodiment, the reading step 310, the determining step 320 and/or the performing step 330 is/are carried out by means of the satellite receiver.

According to one exemplary embodiment, the checking method 300 also has a step 340 of supplying a check signal depending on a comparison result for use by the satellite receiver, the correction data provider, and/or a satellite navigation device in the vehicle. Optionally, the supplying step 340 can also be carried out by means of the satellite receiver.

Exemplary embodiments and advantages of exemplary embodiments are briefly explained and/or presented again in summary in other words below, with reference to the above-described figures, in particular FIGS. 2 and 3.

The correction data provider 206 uses, for example, a network of GNSS reference stations to calculate, from a total of the GNSS observations of multi-frequency receivers installed in said reference stations and from the known positions thereof, the ionospheric correction parameters 213, which are then made available to users of the service. Systematic errors in the GNSS space segment, such as satellite clock errors and orbit errors, are the same for all users and therefore can be modeled well. However, ionospheric interference can be very different locally. The GNSS receivers at the reference stations receive the GNSS signals at different frequencies and can determine the total electron content (TEC) therewith. This value is used to describe the state of the ionosphere. Typically, ionospheric correction parameters 213 are described as an infinitesimally thin, spherical model (single layer model) with a VTEC (vertical TEC). From this, users' receivers can then approximate the STEC (slant TEC) which is valid for their own GNSS observations and is actually valid for the distance between the satellite receiver 208 and the satellite 202.

Since the reference stations cannot be as dense as required and only the STEC values of the individual reference stations are included in the modeling of the ionospheric correction data or ionospheric correction parameters 213, local interference and high gradients can either be modeled with low accuracy or may not be observable for the reference stations. The ionospheric correction parameters 213 and ionospheric errors actually affecting a user would then no longer correspond. According to exemplary embodiments, however, the measurements can be processed with the most correct weighting possible e.g. in the navigation estimation, which can result in improved positioning accuracy and thus can also have an influence on a calculation of the integrity of the satellite navigation system 200.

According to exemplary embodiments, there is a continuous calculation of the STEC values and state information and correction data 215, and a comparison with the STEC values obtained from the ionospheric correction parameters 213. For example, a multi-frequency receiver can be used for this, e.g. using geometry-free linear combinations. If clear deviations in the values are observed in the comparison result 217, or if severe fluctuations occur in one of the parameters, i.e. the ionospheric correction parameters 213 or the correction data 215, this can indicate local ionospheric interference, which can thus be detected. This information can be used within the satellite navigation system 200 to weight individual measurements correspondingly differently and to include this in an integrity assessment of the overall system, and indicate non-availability, if necessary.

For global applications, it is conceivable to divide the Earth's surface into different geographic regions depending on the ionospheric activity or coverage by GNSS users.

For example, it is possible to use the checking apparatus 210 and/or the method 300 to carry out consistency checks between actual observations and model variables for countries (e.g. Europe, North America, China etc.) or geographic latitudes and/or times of day (equatorial, middle latitudes, polar region, day, night). An item of information obtained thereby is used both ways to evaluate the ionospheric correction parameters 213 and can likewise be taken into account in integrity assessment and weighting. A regional consistency check can also be used to validate different correction data providers 206 against one another and to reveal the strengths and weaknesses of models. Such a comparison can provide a selection criterion for or against a provider.

If an exemplary embodiment comprises an "and/or" conjunction between a first feature and a second feature, this should be read to the effect that the exemplary embodiment has both the first feature and the second feature according to one embodiment, and either only the first feature or only the second feature according to another embodiment.

What is claimed is:

1. A method for checking ionospheric correction parameters for satellite navigation for a vehicle, the method comprising:

reading a provider signal from an interface with a correction data provider, the provider signal representing ionospheric correction parameters for correcting ionospheric influences for a geographic position in satellite navigation;

determining correction data using state information relating to a state of an ionosphere between a satellite receiver of the vehicle at the geographic position and at least one satellite, the state information defined using a signal change of at least one satellite signal, transmitted between the at least one satellite and the satellite receiver, as the at least one satellite signal passes through the ionosphere; and checking the ionospheric correction parameters by comparing the ionospheric correction parameters and the correction data.

2. The method according to claim 1, the checking the ionospheric correction parameters further comprising:

generating a comparison result that represents at least one of (i) a deviation between the ionospheric correction parameters, which are model-based, and the correction data, which are observation-based, (ii) a fluctuation in the ionospheric correction parameters, and (iii) a fluctuation in the correction data.

3. The method according to claim 2, the checking the ionospheric correction parameters further comprising:

identifying local ionospheric interference depending on at least one of (i) the deviation between the ionospheric correction parameters and the correction data, (ii) the fluctuation in the ionospheric correction parameters, and (iii) the fluctuation in the correction data.

4. The method according to claim 1 further comprising:
supplying a check signal depending on a comparison result of the comparing to at least one of (i) the satellite receiver, (ii) the correction data provider, and (iii) a satellite navigation device of the vehicle.

5. The method according to claim 1, wherein the satellite receiver performs at least one of (i) the reading of the provider signal, (ii) the determining of the correction data, and (iii) the checking of the ionospheric correction parameters.

6. The method according to claim 1, wherein the signal change represents a result of a comparison of at least one signal property in relation to at least two transmission frequencies of the at least one satellite signal.

7. The method according to claim 1, the determining the correction data further comprising:

determining correction data using state information that represents a total electron content as a characteristic variable of Earth's ionosphere, the total electron content being defined as a product of electron density and path, measured in electrons per square meter.

8. The method according to claim 1, wherein the method is carried out by executing a computer program.

9. An apparatus for checking ionospheric correction parameters for satellite navigation for a vehicle, the apparatus having suitable units configured to:

read a provider signal from an interface with a correction data provider, the provider signal representing ionospheric correction parameters for correcting ionospheric influences for a geographic position in satellite navigation;

determine correction data using state information relating to a state of an ionosphere between a satellite receiver of the vehicle at a geographic position and at least one satellite, the state information defined using a signal change of at least one satellite signal, transmitted between the at least one satellite and the satellite receiver, as the at least one satellite signal passes through the ionosphere; and check the ionospheric correction parameters by comparing the ionospheric correction parameters and the correction data.

10. A non-transitory machine-readable storage medium that stores a computer program for checking ionospheric correction parameters for satellite navigation for a vehicle, the computer program being configured to:

read a provider signal from an interface with a correction data provider, the provider signal representing ionospheric correction parameters for correcting ionospheric influences for a geographic position in satellite navigation;

determine correction data using state information relating to a state of an ionosphere between a satellite receiver of the vehicle at a geographic position and at least one satellite, the state information defined using a signal change of at least one satellite signal, transmitted between the at least one satellite and the satellite receiver, as the at least one satellite signal passes through the ionosphere; and check the ionospheric correction parameters by comparing the ionospheric correction parameters and the correction data.

* * * * *